US011718796B2

(12) United States Patent
Schmidt et al.

(10) Patent No.: US 11,718,796 B2
(45) Date of Patent: Aug. 8, 2023

(54) PROCESS AND PLANT FOR SEPARATION OF CONCOMITANTS FROM A RAW SYNTHESIS GAS STREAM AND FOR PRODUCING A SULFUR-FREE BY-PRODUCT

(71) Applicant: L'Air Liquide, Société Anonyme pour l'Etude et l'Exploitation des Procédés Georges Claude, Paris (FR)

(72) Inventors: Sophia Schmidt, Frankfurt (DE); Sharon Corbet, Frankfurt (DE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 17/004,745

(22) Filed: Aug. 27, 2020

(65) Prior Publication Data

US 2021/0071090 A1    Mar. 11, 2021

(30) Foreign Application Priority Data

Sep. 6, 2019   (EP) ..................................... 19020517

(51) Int. Cl.
  *C10G 5/04* (2006.01)
  *C10G 31/08* (2006.01)
  (Continued)

(52) U.S. Cl.
  CPC ........... *C10G 5/04* (2013.01); *B01D 53/1406* (2013.01); *B01D 53/1418* (2013.01);
  (Continued)

(58) Field of Classification Search
  None
  See application file for complete search history.

(56) References Cited

U.S. PATENT DOCUMENTS 10,245,549 B2 *  4/2019  Kerestecioglu ........ B01D 53/14
2014/0361264 A1  12/2014  Choi et al.
(Continued)

FOREIGN PATENT DOCUMENTS

DE    10 2014 118 345    6/2016
WO    WO 2016 091393     6/2016

OTHER PUBLICATIONS

Ullmann's Encyclopedia of Industrial Chemistry, Physical absorption processes, 6th ed. vol. 15, 399-407.

*Primary Examiner* — Tam M Nguyen
(74) *Attorney, Agent, or Firm* — Elwood L. Haynes

(57) ABSTRACT

The invention relates to a process and a plant for staged separation of concomitants from a raw synthesis gas stream to produce synthesis gas and a sulfur-free naphtha product as a by-product, To remove naphtha compounds and sulfur-containing concomitants, raw synthesis gas is treated with a scrubbing medium in a prescrubbing stage and withdrawn from the prescrubbing stage, and the laden scrubbing medium is mixed with water to bring about a phase separation into a scrubbing medium-water mixture and naphtha, wherein sulfur-containing concomitants are in solution in naphtha. To remove the sulfur-containing concomitants the naphtha is heated to obtain sulfur-free naphtha as a by-product of the gas scrubbing.

11 Claims, 1 Drawing Sheet

(51) Int. Cl.
  *C10G 33/00*     (2006.01)
  *B01D 53/14*     (2006.01)
  *C10K 1/00*      (2006.01)
  *C10K 1/08*      (2006.01)

(52) U.S. Cl.
  CPC ..... *B01D 53/1425* (2013.01); *B01D 53/1487* (2013.01); *C10G 31/08* (2013.01); *C10G 33/00* (2013.01); *C10K 1/004* (2013.01); *C10K 1/005* (2013.01); *C10K 1/08* (2013.01); *B01D 2252/2021* (2013.01); *B01D 2257/302* (2013.01); *B01D 2257/304* (2013.01); *B01D 2257/306* (2013.01); *B01D 2257/308* (2013.01); *B01D 2257/504* (2013.01); *B01D 2257/702* (2013.01)

(56) References Cited

U.S. PATENT DOCUMENTS

| | | | |
|---|---|---|---|
| 2017/0361264 A1* | 12/2017 | Meyer | C10K 1/004 |
| 2018/0272269 A1  | 9/2018  | Goetheer | |
| 2021/0071090 A1* | 3/2021  | Schmidt | C10K 1/005 |
| 2021/0402347 A1* | 12/2021 | Szabo | C10K 1/005 |

\* cited by examiner

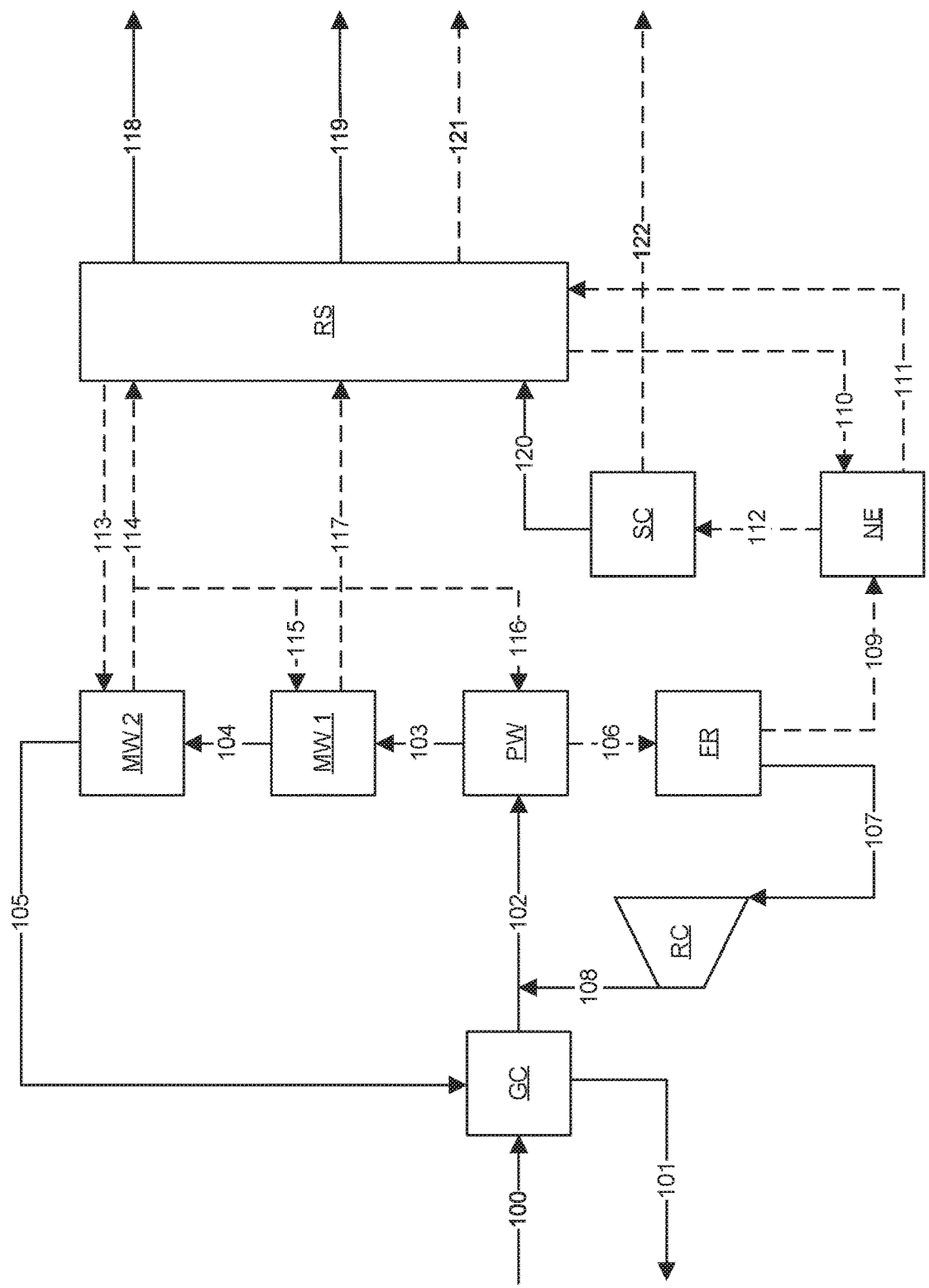

PROCESS AND PLANT FOR SEPARATION OF CONCOMITANTS FROM A RAW SYNTHESIS GAS STREAM AND FOR PRODUCING A SULFUR-FREE BY-PRODUCT

CROSS REFERENCE TO RELATED APPLICATIONS

This application claims priority to European Patent Application No. 19020517.9, filed Sep. 6, 2019, the entire contents of which are incorporated herein by reference.

BACKGROUND

Field of the Invention

The invention relates to a process and a plant for staged separation of concomitants from a raw synthesis gas stream to produce synthesis gas and a sulfur-free naphtha product as a by-product. The invention further relates to the use of the process according to the invention and the plant according to the invention for treatment of a raw synthesis gas from a fixed bed pressure gasification of a carbon-containing input material.

Prior Art

Processes for separation of undesired concomitants from industrial raw synthesis gases by physical absorption are known from the prior art. Thus such processes may be used to remove, down to trace amounts, undesired constituents of raw synthesis gases produced by gasification or reforming of carbon-containing input materials, for example carbon dioxide ($CO_2$), hydrogen sulfide ($H_2S$) and carbonyl sulfide (COS) from the desired synthesis gas constituents such as hydrogen ($H_2$) and carbon monoxide (CO).

These processes also referred to as gas scrubbings utilize the properties of liquids to absorb gaseous substances and to keep them in solution in physically or chemically bound form. The efficiency with which a gas is absorbed by a liquid is expressed by the absorption coefficient. The better the absorption or dissolution of the gas in the liquid, the greater the absorption coefficient. The absorption coefficient generally increases with decreasing temperature and, in accordance with Henry's law, with increasing pressure. The liquids employed in gas scrubbings are generally also referred to as scrubbing media.

Subsequently to the gas scrubbing, components scrubbed out of the raw synthesis gas in the gas scrubbing are removed from the laden scrubbing medium to obtain a regenerated or at least partially regenerated scrubbing medium. Known processes for regenerating the scrubbing medium are decompression (flashing), decompression with stripping gas (stripping) and depressurization with stripping gas wherein the intrinsic vapour of the scrubbing medium is used as the stripping gas (hot regeneration). In order to be usable for renewed absorption of gas components from the raw synthesis gas the scrubbing medium is typically subjected to a hot regeneration in the last regeneration stage. The hot regeneration recovers a virtually pure scrubbing medium which is suitable for the renewed absorption of undesired gas constituents from the raw synthesis gas.

An important process for the purification of raw synthesis gases is methanol scrubbing, also known as the Rectisol process, as described in principle for example in Ullmann's Encyclopedia of Industrial Chemistry, 6th Ed. Vol, 15, p. 399 et seq. The Rectisol process utilizes the fact that the absorption coefficients of $H_2S$, COS and $CO_2$ in liquid cryogenic methanol differ by several orders of magnitude from those of $H_2$ and CO. After the scrubbing operation the methanol is regenerated and recycled into the process.

Depending on the employed input material for producing the raw synthesis gas further concomitants may have to be removed from the raw synthesis gas by the relevant gas scrubbing process to produce the (purified) synthesis gas. For example the fixed bed pressure gasification of carbon-containing input materials, in particular of coal, generates not only the customary undesired concomitants ($H_2S$, COS and $CO_2$) but also further sulfur-containing concomitants such as alkyl mercaptans, heteroaromatics such as thiophene and generally saturated aliphatic hydrocarbons and aromatic hydrocarbons which require removal from the raw synthesis gas. The aliphatic hydrocarbons include in particular hydrocarbons which are gaseous and low-boiling at standard pressure, for example those having 2 to 7 carbon atoms. Higher-boiling hydrocarbons, for example having 6 to 12 carbon atoms, may also be present in the raw synthesis gas to a lesser extent. The aromatic hydrocarbons include in particular compounds such as benzene, toluene and xylenes which are altogether often referred to as "BTX" compounds. In this context the low-boiling aliphatic hydrocarbons and BTX aromatics as well as any higher-boiling hydrocarbons are often collectively referred to as "naphtha". In the gas scrubbing of raw synthesis gases from fixed bed pressure gasifications the complete removal of naphtha and alkyl mercaptans thus constitutes a particular objective of the process.

In order to achieve this objective, known industrial processes often employ so-called prescrubbing stages in which the naphtha and the alkyl mercaptans are removed before the "main impurities", generally $CO_2$ and $H_2S$, and small amounts of COS are removed in the subsequent main scrubbing stages. The main scrubbing stages are always arranged downstream of the prescrubbing stages in the gas flow direction.

If naphtha is generated as a concomitant group in the raw synthesis gas, the amounts separated in the gas scrubbing in industrial processes are generally sufficiently high that the naphtha should be supplied to a valorization. The naphtha separated from the raw synthesis gas may thus be sent for further processing for utilization as a fuel for example. As a result, the separated naphtha which is a by-product of synthesis gas production is subject to the same quality requirements also demanded from the synthesis gas produced in the main process. In particular, the naphtha produced as a by-product should also be free from any sulfur compounds whatsoever.

The abovementioned use of prescrubbers has the problem that naphtha and alkyl mercaptans and also further sulfur compounds are generally co-absorbed in the prescrubber. This is the case irrespective of whether the prescrubber comprises only one or a plurality of prescrubbing stages. The absorption coefficients of the compounds present in naphtha and of alkyl mercaptans do not differ sufficiently in terms of the typically employed scrubbing media and temperature ranges for a completely selective absorption of both substance types to be possible economically using a plurality of prescrubbing stages.

DE 10 2014 118 345 A1 discloses a prescrubber comprising two prescrubbing stages. In the first prescrubbing stage the scrubbing medium, in this case methanol, absorbs primarily naphtha. Coabsorption of alkyl mercaptans and other sulfur compounds in the methanol of the first prescrubbing stage is unavoidable.

In the second prescrubbing stage predominantly alkyl mercaptans are absorbed. The methanol laden with alkyl mercaptans generated in this prescrubbing stage is partially withdrawn from the second pescrubbing stage for use as a scrubbing medium in the first prescrubbing stage. The scrubbing medium withdrawn from the second prescrubbing stage thus already contains alkyl mercaptans which are additionally introduced into the scrubbing medium of the first prescrubbing stage. The naphtha is separated by extraction using water in a downstream process step. The alkyl mercaptans remain in the naphtha phase, i.e. accumulate therein. This has the result that the primarily produced naphtha product is contaminated with undesired sulfur compounds and is therefore of lesser quality.

This problem is amplified when methanol already laden with sulfur compounds from one of the main scrubbing stages is used for pre-scrubbing in at least one of the prescrubbing stages. In this case not only the methyl mercaptans but also additional amounts of undesired sulfur compounds such as hydrogen sulfide and carbonyl sulfide may accumulate in the naphtha product.

To summarize, the known processes and plants in principle suffer from the problem of accumulation of sulfur compounds in the naphtha irrespective of whether one or more prescrubbing stages are used and irrespective of whether the prescrubbing and main scrubbing stages are integrated in a single scrubbing column or whether these stages are configured as a prescrubber and a main scrubber with scrubbing columns that are spatially separate from one another.

SUMMARY

It is a general object of the present invention to overcome the abovementioned disadvantages of the prior art.

It is a further object of the invention to achieve complete or at least substantially complete removal of sulfur compounds from the naphtha product in the context of the performed gas scrubbing process. It is accordingly a particular object of the invention to exclude sulfur compounds from the naphtha product even during the gas scrubbing process so that a downstream and thus usually costly and complex workup of the naphtha product is not required.

It is a further object of the invention to achieve complete or at least substantially complete removal of sulfur compounds from the naphtha product in order to increase the sulfur yield in a sulfur recovery process, in particular a Claus process, arranged downstream of the gas scrubbing.

BRIEF DESCRIPTION OF THE DRAWING

The invention is hereinbelow particularized by a drawing and a working example, wherein the drawing and the working example are not intended to limit the invention in any way. Unless otherwise stated the drawing is not to scale.

FIG. 1 shows a process flow diagram of the process according to the invention or of the plant according to the invention in an embodiment with methanol as the scrubbing medium.

DESCRIPTION OF THE PREFERRED EMBODIMENTS

The independent claims provide a contribution to the at least partial achievement of at least one of the above objects.

The dependent claims provide preferred embodiments which contribute to the at least partial achievement of at least one of the objects. Preferred embodiments of constituents of a category according to the invention are, where relevant, likewise preferred for identically named or corresponding constituents of a respective other category according to the invention.

The terms "having", "comprising" or "containing" etc. do not preclude the possible presence of further elements, ingredients etc. The indefinite article "a" does not preclude the possible presence of a plurality.

The objects of the invention are at least partially achieved by a process for staged separation of concomitants from a raw synthesis gas stream to produce synthesis gas by absorption of the concomitants in a physical scrubbing medium run in countercurrent to the raw synthesis gas stream in a plurality of scrubbing stages at elevated pressure, wherein the concomitants comprise at least carbon dioxide ($CO_2$), one or more sulfur compounds of a first type, one or more sulfur compounds of a second type and naphtha, wherein the process comprises the following steps, wherein the process steps need not necessarily be performed in the recited sequence:

a) absorbing at least naphtha and sulfur compounds of the first type in a prescrubbing stage to afford a scrubbing medium fraction laden at least with naphtha and sulfur compounds of the first type;

b) mixing the laden scrubbing medium fraction obtained in step a) with water to effect a phase separation into two liquid phases, wherein a first liquid phase comprises water and scrubbing medium and a second liquid phase comprises naphtha and sulfur compounds of the first type dissolved therein;

c) heating the second liquid phase obtained in step b) to remove the sulfur compounds of the first type and obtain sulfur-free naphtha;

d) absorbing carbon dioxide and sulfur compounds of the second type in at least one main scrubbing stage arranged downstream of the prescrubbing stage in the gas flow direction to obtain at least one scrubbing medium fraction laden with at least carbon dioxide or sulfur compounds of the second type;

e) regenerating the laden scrubbing medium fractions obtained in steps a) and d) and reusing the regenerated scrubbing medium for absorbing concomitants in steps a) and d).

The process according to the invention has the feature that naphtha present in the raw synthesis gas and sulfur compounds of a first type are initially absorbed in the scrubbing medium in a prescrubbing stage. The prescrubbing stage is the first scrubbing stage with which the raw synthesis gas stream to be purified enters into mass transfer. The scrubbing medium fraction obtained during absorption in the prescrubbing stage which contains scrubbing medium laden with naphtha and one or more sulfur compounds of the first type is subsequently mixed with water in a suitable apparatus, for example an extraction apparatus. This performs a phase separation into two liquid phases since due to the contact with water the relatively nonpolar and hydrophobic naphtha no longer remains dissolved in the relatively polar and hydrophilic scrubbing medium. The phases produced in the phase separation in step b) thus consist substantially of a hydrophilic scrubbing medium/water phase and a hydrophobic naphtha phase. The second (hydrophobic) phase is separated from the first (hydrophilic) phase. Due to the good solubility of the sulfur compounds of the first type in naphtha a significant proportion of these sulfur compounds remains in the separated hydrophobic naphtha phase. These are subsequently expelled therefrom by heating to obtain a sulfur-free naphtha, Since sulfur compounds present in the raw synthesis gas generally have a low boiling point and high vapour pressure these are easily removable from the naphtha by heating. It has surprisingly been found that even sulfur compounds having a relatively high boiling point, such as thiophene, are removable from naphtha by simple heating.

The step of heating (step c)) is by preference performed at a temperature of 40° C. to 250° C., preferably at a temperature of 70° C. to 150° C. and particularly preferably at a temperature of 90° C. to 120° C.

The type of process mode according to the invention directly affords a sulfur-free naphtha as a by-product of the gas scrubbing process without any need to subject the naphtha to a costly and complex purification process after discharging from the gas scrubbing.

Further concomitants, in particular sulfur compounds of the second type and carbon dioxide, are removed from the raw synthesis gas in one or more main scrubbing stages arranged downstream of the prescrubbing stage according to step d). All laden scrubbing medium fractions obtained in the gas scrubbing process are subjected to regeneration in step e) and subsequently reused for reabsorption of concomitants (steps a) and d)).

If required, the prescrubbing stage may comprise a plurality of partial prescrubbing stages. In one example a first partial prescrubbing stage removes primarily the naphtha compounds. A second partial prescrubbing stage removes primarily the sulfur compounds of the first type and the thus obtained scrubbing medium may be partially used for the removal of naphtha in the first partial prescrubbing stage. As a result the scrubbing medium fraction discharged from the first partial prescrubbing stage comprises both sulfur compounds of the first type and naphtha.

A preferred embodiment of the process according to the invention is characterized in that the sulfur compounds of the first type comprise at least one element from the group of alkyl mercaptans (R-SH), carbon disulfide ($CS_2$), thiophenes. A preferred embodiment of the process according to the invention is further characterized in that the sulfur compounds of the second type comprise at least one element from the group of hydrogen sulfide ($H_2S$), carbonyl sulfide (COS).

The scrubbing medium fraction discharged from the prescrubbing stage preferably comprises alkyl mercaptans and/or thiophenes but this does not preclude the scrubbing medium fraction discharged from the prescrubbing stage from also comprising sulfur compounds of the second type, for example hydrogen sulfide, depending on the process mode. This is the case for example when a scrubbing medium already laden with hydrogen sulfide is used for the prescrubbing stage for reasons of process economy. It is also possible for sulfur compounds of the second type to be co-absorbed together with sulfur compounds of the first type in the prescrubbing stage. According to the invention these sulfur compounds of the second type are likewise expelled from the naphtha in step c).

The scrubbing medium fraction discharged from a main scrubbing stage preferably comprises hydrogen sulfide and/or carbonyl sulfide and optionally carbon dioxide. Again, this does not preclude scrubbing medium fractions from the main scrubbing stages from containing sulfur compounds of the first type depending on the process mode. This is the case for example when a scrubbing medium already laden with alkyl mercaptans is used for one of the main scrubbing stages for reasons of process economy.

A preferred embodiment of the process according to the invention is characterized in that the scrubbing medium comprises methanol. Examples of large industrial-scale gas scrubbing processes employing methanol as a scrubbing medium are the standard Rectisol process and the selective Rectisol process.

A preferred embodiment of the process according to the invention is characterized in that the scrubbing medium fraction laden with naphtha and sulfur compounds of the first type is supplied to a decompression stage for recovery of valuable gases, in particular of hydrogen ($H_2$) and carbon monoxide (CO).

Valuable gases co-absorbed in the scrubbing medium are preferably expelled from the scrubbing medium by decompression before scrubbing medium laden with sulfur compounds of the first type and naphtha is admixed with water for phase separation. This increases the synthesis gas yield of the overall process. The expelled valuable gases are recompressed to absorption pressure and combined with the raw synthesis gas stream.

A preferred embodiment of the process according to the invention is characterized in that the first liquid phase is subjected to a thermal separation process for separating naphtha residues from the first liquid phase to obtain naphtha and a water-scrubbing medium mixture as products of the thermal separation process.

Depending on the polarity, and thus the more hydrophilic or hydrophobic character of the scrubbing medium used, naphtha may also be present in the first liquid phase, the scrubbing medium/water mixture. To recover it, this naphtha is preferably separated from water and the employed scrubbing medium in a thermal separation process. The employed thermal separation process is preferably a rectification. Investigations have shown that significant amounts of naphtha are present in the first liquid phase in particular when using methanol as scrubbing medium. The thermal separation of naphtha from the first liquid phase is particularly advantageously employed in all gas scrubbing processes using methanol as scrubbing medium.

The naphtha thermally separated from the first liquid phase is preferably recycled to step b).

It has proven particularly advantageous to recycle the naphtha thermally separated from the first liquid phase into the circuit, i.e. (re)admix it with water together with the scrubbing medium stream from the prescrubbing stage. This has proven advantageous over an alternative process mode of supplying the naphtha thermally separated from the first liquid phase to the second liquid phase. The naphtha thermally separated from the first liquid phase may still comprise traces of scrubbing medium and water. A higher purity of the naptha product to be produced and an improved recovery of naphtha and scrubbing medium and water are therefore achieved when the naphtha product originally separated from the first liquid phase is recycled to step b). In the subsequent phase separation of step c) into a hydrophobic phase and a hydrophilic phase the naphtha may be separated in high purity as the hydrophobic phase.

It is preferable when the thermally separated water-scrubbing medium mixture is subjected to a further thermal separation process to obtain water and scrubbing medium as products of the thermal separation process and the obtained scrubbing medium is subjected to hot regeneration and subsequently reused for absorbing concomitants in steps a) and/or d). The thermally separated water may also be used for producing the phase separation in step b). All solvents used in the process can thus be recycled into the circuit without any need for external supply of solvents. The thermal separation process is preferably a distillation, particularly preferably a rectification. Depending on the process mode a complete separation of scrubbing medium and water is not necessary depending on the polarity of the employed scrubbing medium. The phase separation in step b) may optionally be carried out through addition of water still containing residual amounts of scrubbing medium.

A preferred embodiment of the process according to the invention is characterized in that the sulfur compounds of the first type are removed from the second liquid phase by heating in a stripping column.

It has proven particularly simple and advantageous to heat the naphtha in a simple stripping column for example using a heat exchanger ("reboiler") integrated into the column to expel (strip) the sulfur compounds of the first type. It has been found that this procedure advantageously and surprisingly works for most substance compositions without addition of an auxiliary gas (stripping gas). A stripping gas would require costly and complex subsequent removal from the sulfurous gas-containing stream since it is disruptive in the further processing of the sulfur-containing gases in the context of the sulfur recovery.

A preferred embodiment of the process according to the invention is characterized in that the sulfur compounds of the first type are removed from the second liquid phase by introduction of saturated steam into the second liquid phase and the sulfur-free naphtha is subsequently subjected to a further treatment step for separation of water. Saturated steam may also be used to completely remove less volatile, higher-boiling sulfur compounds from the naphtha. The use of saturated steam may become necessary especially when relatively large amounts of relatively long-chain alkyl mercaptans, for example having chains of four or more carbon atoms, and heterocyclic sulfur-containing aryl compounds, for example thiophene and derivatives thereof, have accumulated in the naphtha. Although this procedure does require a further purification step of the naphtha the use of saturated steam nevertheless ensures the complete removal of all common sulfur-containing concomitants occurring in raw synthesis gases.

A preferred embodiment of the process according to the invention is characterized in that the sulfur compounds of the first type removed from the second liquid phase by heating are supplied to a sulfur recovery plant. The sulfur recovery plant is preferably a plant in which the Claus process known to those skilled in the art is used. The sulfur compounds of the first type are advantageously combined with the sulfur compounds of the second type likewise generated in the context of the gas scrubbing process and supplied to the sulfur recovery.

The objects of the invention are further at least partially solved by a plant for staged separation of concomitants from a raw synthesis gas stream to produce synthesis gas by absorption of the concomitants in a physical scrubbing medium run in countercurrent to the raw synthesis gas stream in a plurality of scrubbing stages at elevated pressure, wherein the concomitants comprise at least carbon dioxide ($CO_2$), one or more sulfur compounds of a first type, one or more sulfur compounds of a second type and naphtha, wherein the plant comprises the following components:

a) a prescrubber for absorbing at least naphtha and sulfur compounds of the first type in the scrubbing medium, by means of which a scrubbing medium fraction laden at least with naphtha and sulfur compounds of the first type is obtainable in the prescrubber;

b) an extraction apparatus for mixing the laden scrubbing medium fraction obtainable in the prescrubber with water to produce a phase separation into two liquid phases, by means of which a first liquid phase comprising water and scrubbing medium is obtainable and a second liquid phase comprising naphtha and sulfur compounds of the first type dissolved therein is obtainable;

c) a column arranged downstream of the extraction apparatus in which the second liquid phase is heatable and the sulfur compounds of the first type are thus removable, by means of which sulfur-free naphtha is obtainable in the column;

d) a main scrubber arranged downstream of the prescrubber in the gas flow direction for absorption of carbon dioxide and sulfur compounds of the second type, wherein the main scrubber comprises at least one main scrubber stage in which at least one scrubbing medium fraction laden with at least carbon dioxide or sulfur compounds of the second type is obtainable;

e) a regeneration system in which the scrubbing medium fractions obtainable in the prescrubber and the main scrubber are regenerable for reabsorption of concomitants in the prescrubber and the main scrubber.

The objects of the invention are further at least partially solved by the use of the process according to the invention or the plant according to the invention for treatment of a raw synthesis gas from a fixed bed pressure gasification of a carbon-containing input material.

Especially raw synthesis gases from fixed bed pressure gasification of carbon-containing input materials comprise a large proportion of sulfur compounds and naphtha and the process according to the invention or the plant according to the invention are therefore advantageously employed in the treatment of such raw synthesis gases. The carbon-containing input material comprises at least one element from the group of coal, petroleum coke.

Raw Synthesis Gas

The raw synthesis gas comprises at least hydrogen ($H_2$) and at least one carbon oxide and undesired concomitants. The term "carbon oxides" is a collective term for the compounds carbon dioxide ($CO_2$) and carbon monoxide (CO). The raw synthesis gas typically comprises a mixture of carbon dioxide and carbon monoxide. In some cases the raw synthesis gas may contain exclusively or almost exclusively carbon dioxide depending on the application. Such raw synthesis gas compositions are obtainable for example by a water gas shift reaction by means of which the hydrogen proportion in the raw synthesis gas is increased. This also converts carbon monoxide into carbon dioxide to reduce the carbon monoxide proportion.

The raw synthesis gas may derive from any source known to those skilled in the art. In a preferred example the raw synthesis gas derives from a coal gasification process, preferably from a fixed bed pressure gasification process. In a further example the raw synthesis gas derives from a reforming process. The reforming process may comprise one or more steps such as steam reforming, partial oxidation or autothermal reforming.

Independently of the source from which it derives the raw synthesis gas may be produced at a temperature between 400° C. and 1200° C. and/or at a pressure between 10 and 60 bar. In addition to the abovementioned constituents the input gas may also contain different amounts of inert constituents such as methane or nitrogen.

Pressures reported in bar in connection with the subject matter of the invention are to be understood as meaning absolute pressure in bar.

Synthesis Gas

The synthesis gas is a raw synthesis gas freed of undesired concomitants. Depending on the requirements it is not necessarily the case that undesired concomitants must be completely removed from the raw synthesis gas to obtain on-specification synthesis gas. Complete removal of carbon dioxide is in particular not desired in every case since in methanol synthesis for example certain residual amounts of carbon dioxide favour the kinetics of the catalytic conversion.

Concomitant

Concomitants present in the raw synthesis gas, also known as undesired concomitants, are for example carbon dioxide, sulfur compounds such as hydrogen sulfide, carbonyl sulfide, alkyl mercaptans, in particular methyl mercaptan, carbon disulfide and aromatic heterocyclic sulfur compounds, in particular thiophene. Alkyl mercaptans and aromatic heterocyclic sulfur compounds in particular occur in raw synthesis gases from coal gasification. Further concomitants possibly present in the raw synthesis gas are compounds such as ammonia and hydrogen cyanide and also metal carbonyls. The latter are metal complexes in which carbon monoxide is coordinatively bonded to a central metal atom. Metal carbonyls can cause problems due in particular to their propensity for reacting with hydrogen sulfide and forming poorly soluble metal sulfides. Metal carbonyls occurring in industrial gas scrubbing processes include in particular nickel carbonyls and iron carbonyls.

Further possible concomitants are aliphatic, alicyclic and aromatic hydrocarbon compounds gaseous at standard pressure and also low-boiling and higher-boiling representatives of said compounds. The aromatic hydrocarbon compounds include in particular benzene, toluene and xylenes (ortho-, meta- and para-xylene) and also naphthalene. The gaseous and also low-boiling and higher-boiling aliphatic and alicyclic hydrocarbons include in particular the homologous series of the cycloalkanes and to a lesser extent alkenes and alkynes, for example having 1 to 12 carbon atoms, in particular having 1 to 6 carbon atoms.

Sulfur Compounds of the First and Second Type

According to the invention a "sulfur compound of the first type" is understood to be a sulfur compound which, based on the chosen absorption parameters, is easier to remove than a "sulfur compound of the second type". In other words a sulfur compound of the first type has a higher absorption coefficient based on the employed scrubbing medium and the prevailing temperature than a sulfur compound of the second type. Thus, sulfur compounds of the first type are preferably removed in the context of a prescrubbing stage according to the invention while sulfur compounds of the second type are preferably removed via one or more main scrubbing stages. The main scrubbing stage or the plurality of main scrubbing stages are arranged downstream of the prescrubbing stage in the gas flow direction. Sulfur compounds of the second type are only absorbed to a small extent, if at all, in the context of the prescrubbing stage. The majority of a sulfur compound of the second type passes into the main scrubbing stage or one of the main scrubbing stages and is absorbed there by the relevant scrubbing medium. Sulfur compounds of the second type can also occur in the prescrubbing stage when scrubbing medium comprising sulfur compounds of the second type is used in the prescrubbing stage. In this case the process according to the invention removes from the naphtha not only sulfur compounds of the first type but also sulfur compounds of the second type. Sulfur compounds of the second type may also be co-absorbed in the prescrubbing stage, Vice versa sulfur compounds of the first type may also be co-absorbed in a main scrubbing stage.

In one example, based on methanol as the scrubbing medium, sulfur compounds of the first type are alkyl mercaptans and heterocyclic aromatic sulfur compounds. Examples of alkyl mercaptans are methanethiol, ethanethiol and propanethiol, One example of a heterocyclic aromatic sulfur compound is thiophene.

In one example, based on methanol as the scrubbing medium, sulfur compounds of the second type are hydrogen sulfide or carbonyl sulfide.

Elevated Pressure

The absorption of the undesired concomitants in the scrubbing medium is carried out under elevated pressure since the absorption coefficient increases with increasing pressure. The absorption is therefore typically carried out at pressures between 20 and 100 bar.

Regeneration

To remove the undesired concomitants from the scrubbing medium, for regeneration of the scrubbing medium, the pressure is typically reduced to 1.5 to 70 bar depending on whether a high pressure regeneration (20 to 70 bar), intermediate pressure regeneration (15 to 40 bar) or low pressure regeneration (0 to 15 bar, preferably 1.5 to 15 bar) is concerned. In one example appropriate regeneration columns are arranged in series in a cascade, the pressure reducing from one column to the next.

In a regeneration column the undesired concomitants may be removed either exclusively by pressure reduction (flashing), by pressure reduction in conjunction with a stripping gas (stripping) or by hot regeneration. One example of a suitable stripping gas is nitrogen. In hot regeneration the intrinsic vapour of the scrubbing medium, for example methanol, is typically used as the stripping gas.

Physical Scrubbing Medium

In a physical scrubbing medium the solubility of the relevant gas, for example of the undesired concomitant, is brought about by physical interactions.

In the case of physical scrubbing media the absorption of the undesired concomitants is preferably effected using cold scrubbing media cooled to below ambient temperature as the absorbent since the absorption coefficient for the undesired constituents increases with decreasing temperature of the scrubbing medium. Intensive mass transfer between the raw synthesis gas and the scrubbing medium takes place in an absorption column, also known as a scrubbing column. The absorption column in which the raw synthesis gas and the scrubbing medium are run in countercurrent to one another may be provided with random packings or trays to improve mass transfer.

Naphtha

Naphtha is produced as a by-product of the gas scrubbing in the context of the process according to the invention. This is in principle a substance mixture of varying composition which may be utilized directly as crude naphtha or may be utilized as fuel (for example petrol) after appropriate workup. Naphtha comprises especially low-boiling aliphatic and alicyclic hydrocarbons, for example hydrocarbons having a boiling point (at standard pressure) of 30° C. to 150° C. Naphtha may optionally also contain higher-boiling aliphatic and alicyclic hydrocarbons having a boiling point (at standard pressure) of 120° C. to 240° C. Low-boiling hydrocarbons present in naphtha include for example saturated hydrocarbons (alkanes and cycloalkanes) having 5 to 7 carbon atoms in particular. Higher-boiling hydrocarbons present in naphtha include for example saturated hydrocarbons (alkanes and cycloalkanes) having 6 to 12 carbon atoms in particular. These may also be accompanied to a small extent by unsaturated aliphatic and alicyclic hydrocarbons. Naphtha further contains aromatic hydrocarbons having 6 to 10 carbon atoms, for example benzene, toluene and xylenes, or naphthalene.

Sulfur-Free Naphtha

Sulfur-free naphtha as producible by the process according to the invention either contains no sulfur-containing compounds or is substantially sulfur-free. The latter may alternatively be referred to as a low-sulfur naphtha. In this case the naphtha obtainable as a by-product contains sulfur compounds in a concentration of not more than 0.1 mol %, preferably not more than 0.01 mol %, particularly preferably not more than 0.001 mol % and more preferably not more than 0.0001 mol %. Completely sulfur-free naphtha is unobtainable by the process according to the invention only in rare cases where high-boiling sulfur compounds which are not removable or not completely removable by heating accumulate in the naphtha in the course of the gas scrubbing process. Whether such high-boiling sulfur compounds cause problems depends on the type and composition of the input material used in the raw synthesis gas production, for example the employed coal.

Coal

Coal is to be understood as meaning a category of solid, fossil, carbon-containing raw materials formed by carbonization of plant remains. For the purposes of the present application this category includes representatives having different degrees of coalification spanning from lignite (low coalification) to anthracite (high coalification). In a broader interpretation, representatives having an even lower coalification, for example peat; may be included in this umbrella term; they thus form smooth transition to the neighbouring category of biomass. A characterizing feature of all representatives of this category is, inter glia, their more or less pronounced sulfur content.

In FIG. 1 streams of gases are represented by solid lines while streams of liquids are represented by dashed lines.

In the working example of FIG. 1 a raw synthesis gas 100 (composition in mol %: 36% $CO_2$; 12.2% CO; 39.2% $H_2$; 11.3% $CH_4$; 0.4% ethane; 0.1% propane; 0.1% n-butane 0.1%; 0.2% $N_2$+Ar; 0.3% $H_2$S/COS/mercaptans; 0.2% naphtha) is supplied with a volume flow of 600 $kNm^3$/h, cooled to a temperature of minus 10° C. (−10° C.) in the gas cooling GC and introduced into prescrubbing stage PW at an adsorption pressure of 45 bar. In the prescrubbing stage PW the raw synthesis gas is treated with cryogenic methanol (methanol temperature: minus 30° C.) from methanol stream 116. Methanol stream 116 is diverted from methanol stream 114 as a substream and already contains carbon dioxide ($CO_2$) absorbed from the second main scrubbing stage MW 2. In the prescrubbing stage PW the raw synthesis gas is freed of naphtha compounds and alkyl mercaptans (sulfur compounds of the first type in the context of the invention). In the prescrubbing stage PW methanol 116 also co-absorbs small proportions of valuable gases (hydrogen and carbon monoxide) and hydrogen sulfide ($H_2$S) from the raw synthesis gas 102.

Methanol 106 laden with the abovementioned substances is discharged from the prescrubbing stage and initially introduced into a flash regeneration stage FR wherein a pressure reduction to 7 bar is carried out. The pressure reduction causes outgassing substantially of the valuable gases hydrogen and carbon monoxide which are discharged from the flash regeneration stage FR as recycled valuable gases 107. Valuable gases 107 are subsequently subjected to a recompression RC and thus recompressed to the original absorption pressure of 45 bar. Recompression RC is in the form of a single-stage or multi-stage gas compressor. The valuable gases 108 recompressed to absorption pressure are supplied to the cooled (main) raw synthesis gas stream 102.

The raw synthesis gas stream 103 freed of naphtha compounds and alkyl mercaptans is withdrawn from the prescrubbing stage PW and introduced into the first main scrubbing stage MW 1. In the main scrubbing stage MW 1 the raw synthesis gas 103 is treated with methanol 115 which was diverted from methanol stream 114 as a substream and already contains carbon dioxide ($CO_2$) absorbed in the second main scrubbing stage MW 2. In the first main scrubbing stage MW 1 raw synthesis gas 103 is substantially freed of hydrogen sulfide ($H_2$S) and carbonyl sulfide (COS). Raw synthesis gas 104 substantially still containing carbon dioxide as an undesired constituent is subsequently withdrawn from the first main scrubbing stage MW 1 and in the second main scrubbing stage MW 2 treated with regenerated methanol 113 to absorb carbon dioxide. The treated raw synthesis gas is subsequently discharged from the process 10/the plant 10 as synthesis gas, wherein it is utilized for cooling the raw synthesis gas 100 in indirect heat exchange in the gas cooling GC.

Carbon dioxide-laden methanol 114 and hydrogen sulfide- and carbonyl sulfide-laden methanol 117 are freed of the abovementioned absorbed constituents in the regeneration system RS. Regeneration system RS comprises at least two or more flash regeneration stages arranged as a cascade, a hot regenerator, optionally a reabsorber and at least one rectification column for methanol/water separation. For the sake of simplicity these components are not shown individually here. The regeneration system RS produces sulfur-containing acid gas 119 which comprises at least hydrogen sulfide and carbonyl sulfide and also carbon dioxide 118, water 121 and regenerated methanol 113 which is recycled into the plant 10 for reabsorption of undesired concomitants in the raw synthesis gas 102 via main scrubbing stage MW 2.

Methanol 109 laden with substantially naphtha compounds and alkyl mercaptans and co-absorbed hydrogen sulfide is withdrawn from the flash regeneration stage FR and introduced into an extraction apparatus for naphtha extraction NE. For naphtha extraction NE the laden methanol 109 is admixed with a water/methanol mixture which was produced in the regeneration system RS and contains primarily water. This brings about a liquid-liquid phase separation into naphtha and a methanol/water mixture 111. The methanol/water mixture 111 is separated and introduced into the regeneration system RS for methanol/water separation, Naphtha radicals are optionally removed from the methanol/water mixture 111 by distillation and recycled to the naphtha extraction NE (not shown).

The naphtha product 112 discharged from the naphtha extraction contains 1.72 mol % of hydrogen sulfide, 4 ppmv of carbonyl sulfide and 0.02 mol % of methanethiol (methyl mercaptan). It is transferred into the stripping column SC and therein heated to a temperature of 109° C. Stripped sulfur-containing gases 120 accumulate in the regeneration system and are sent to sulfur-containing gases 119 or supplied directly to a sulfur recovery plant, for example a Claus plant. The naphtha product 122 freed of sulfur-containing gases is withdrawn from the stripping column. It now contains only traces of hydrogen sulfide, carbonyl sulfide and methyl mercaptan (less than 1 ppm in each case).

LIST OF REFERENCE NUMERALS

GC Gas cooling
PW Prescrubbing stage

MW 1 First main scrubbing stage
MW 2 Second main scrubbing stage
RC Recompression
FR Flash regeneration stage
NE Naphtha extraction
RS Regeneration system
SC Stripping column
Plant, process
100 Raw synthesis gas
101 Synthesis gas
102 Cooled raw synthesis gas
103 Raw synthesis gas
104 Raw synthesis gas
105 Synthesis gas
106 Laden methanol (valuable gases, alkyl mercaptans and naphtha)
107 Valuable gases
108 Valuable gases
109 Laden methanol (alkyl mercaptans and naphtha)
110 Water/methanol
111 Methanol/water
112 Naphtha (crude product, sulfur-containing)
113 Regenerated methanol
114 Laden methanol ($CO_2$)
115 Laden methanol ($CO_2$)
116 Laden methanol ($CO_2$)
117 Laden methanol ($H_2S$, COS)
118 Carbon dioxide
119 Sulfur-containing gases ($H_2S$, COS)
120 Methyl mercaptan, hydrogen sulfide
121 Water
122 Naphtha (by-product, sulfur-free)

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for staged separation of concomitants from a raw synthesis gas stream to produce synthesis gas by absorption of the concomitants in a physical scrubbing medium operated countercurrent to the raw synthesis gas stream in a plurality of scrubbing stages at elevated pressure, wherein the concomitants comprise at least carbon dioxide, one or more sulfur compounds of a first type, one or more sulfur compounds of a second type and naphtha, the process comprising:
   a) absorbing at least naphtha and sulfur compounds of the first type from a raw synthesis gas stream in a prescrubbing stage thereby producing a scrubbing medium fraction laden at least with naphtha and sulfur compounds of the first type;
   b) mixing the laden scrubbing medium fraction obtained in step a) with water to effect a phase separation into two liquid phases, wherein a first liquid phase comprises water and scrubbing medium and a second liquid phase comprises naphtha and sulfur compounds of the first type dissolved therein;
   c) heating the second liquid phase obtained in step b) to remove the sulfur compounds of the first type and obtain sulfur-free naphtha;
   d) absorbing carbon dioxide and sulfur compounds of the second type from the first liquid phase obtained in step b) in at least one main scrubbing stage arranged downstream of the prescrubbing stage in the gas flow direction to obtain at least one scrubbing medium fraction laden with at least carbon dioxide or sulfur compounds of the second type;
   e) regenerating the laden scrubbing medium fraction obtained in step d) and reusing the regenerated scrubbing medium for absorbing concomitants in steps a) and d).

2. The process according to claim 1, wherein the sulfur compounds of the first type comprise at least one element from the group of alkyl mercaptans, carbon disulfide, and thiophenes.

3. The process according to claim 1, wherein the sulfur compounds of the second type comprise at least one element from the group of hydrogen sulfide, and carbonyl sulfide.

4. The process according to claim 1, wherein the scrubbing medium comprises methanol.

5. The process according to claim 1, wherein the scrubbing medium fraction laden with naphtha and sulfur compounds of the first type is supplied to a decompression stage for recovery of valuable gases.

6. The process according to claim 1, wherein the first liquid phase is subjected to a thermal separation process for separating naphtha residues from the first liquid phase to obtain naphtha and a water-scrubbing medium mixture as products of the thermal separation process.

7. The process according to claim 6, wherein the naphtha thermally separated from the first liquid phase is recycled to step b).

8. The process according to claim 6, wherein the thermally separated water-scrubbing medium mixture is subjected to a further thermal separation process to obtain water and scrubbing medium as products of the thermal separation process and the obtained scrubbing medium is subjected to hot regeneration and subsequently reused for absorbing concomitants in steps a) and/or d).

9. The process according to claim 1, wherein the sulfur compounds of the first type are removed from the second liquid phase by heating in a stripping column.

10. The process according to claim 1, wherein the sulfur compounds of the first type are removed from the second liquid phase by introduction of saturated steam into the second liquid phase and the sulfur-free naphtha is subsequently subjected to a further treatment step for separation of water.

11. The process according to claim 1, wherein the sulfur compounds of the first type removed from the second liquid phase by heating are supplied to a sulfur recovery plant.

* * * * *